Oct. 29, 1963   R. E. McCLEARY   3,108,838
SHEET METAL WHEEL CONSTRUCTION
Filed Nov. 8, 1961
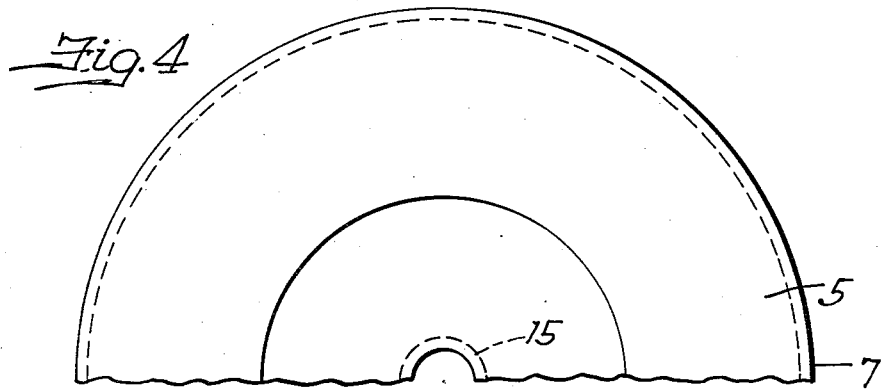
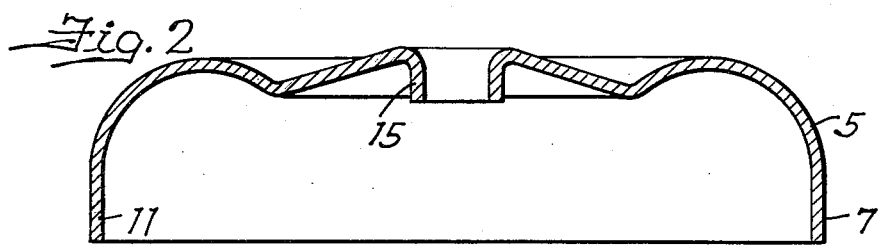
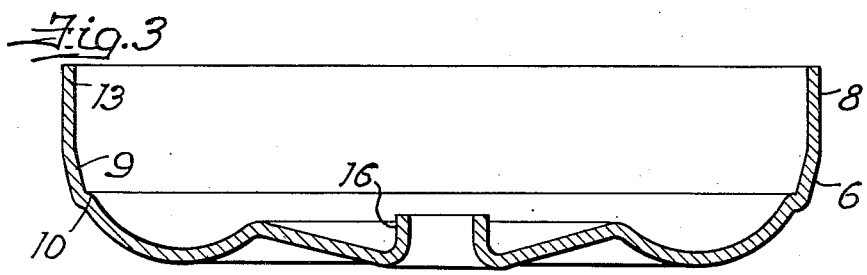
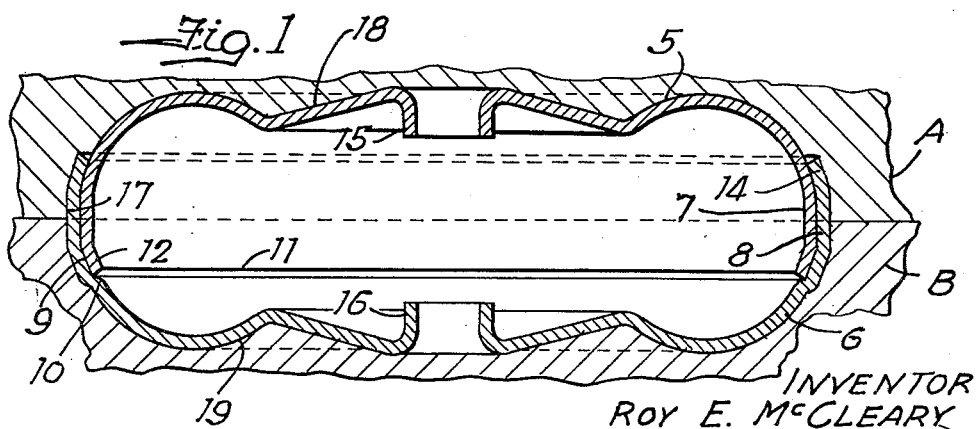
INVENTOR
ROY E. McCLEARY
ATTY.

United States Patent Office 3,108,838
Patented Oct. 29, 1963

3,108,838
SHEET METAL WHEEL CONSTRUCTION
Roy E. McCleary, Rockford, Ill., assignor to Atwood Vacuum Machine Company, Rockford, Ill., a corporation of Illinois
Filed Nov. 8, 1961, Ser. No. 151,054
4 Claims. (Cl. 301—63)

This invention relates to a new and improved sheet metal hollow wheel construction.

The principal object of my invention is to provide a lightweight economical wheel construction, so designed that one half can be pressed into the other half and the two halves can be clinched together between dies in a single press operation, the edge of the circumferential flange on the inner part being swedged inwardly as a result of the pressure, and the corresponding edge portion of the circumferential flange on the outer part being swedged inwardly against the outside of the inner part to produce a double thickness rim portion of greater durability and a wheel of surprising strength, as shown, for example, by the fact that whereas such wheels are intended to support a radial load of approximately one thousand (1000) pounds, there is actually no distortion noticeable under as much as three thousand (3000) pounds loading, and it is believed these wheels could withstand even more.

The invention is illustrated in the accompanying drawing, in which—

FIG. 1 is a cross-section through a sheet metal wheel made in accordance with my invention showing portions of the dies in section used in the assembling operation;

FIGS. 2 and 3 are sections through the two circular sheet metal stampings required in the production of the wheel of FIG. 1, and FIG. 4 is a side view of one-half of the stamping shown in FIG. 2.

The same reference numerals are applied to corresponding parts in these views.

Starting with the two circular sheet metal stampings 5 and 6, in which the circumferentially extending flange 7 has an outside diameter within a few thousandths of an inch under the inside diameter of the circumferentially extending flange 8 of stamping 6, so that the flange 7 of stamping 5 can be entered inside the flange 8 of stamping 6, as appears in FIG. 1, attention is called in stamping 6 to the taper at 9 terminating in an annular shoulder 10 where the edge portion 11 of the flange 7 on stamping 5 is swedged inwardly, as seen at 12 in FIG. 1, when these two stampings are pressed together between a pair of dies A and B that have cavities conformed to the final assembly, as shown in FIG. 1. There the edge portion 13 of flange 8 on stamping 6 is swedged inwardly, as indicated at 14, on the outside of stamping 5.

The two stampings have inwardly extending central cylindrical hub portions 15 and 16 of the same diameter which are coaxially aligned and adapted to receive a horizontal axle, as, for example, in a vertically retractible castering fork on the front end of a trailer.

In the press operation, the swedging at 12 is positively limited by engagement of the edge portion 11 on annular shoulder 10, thereby assuring wheels of uniform width in quantity production. The swedging at 14 to clinch the two halves 5 and 6 of the wheel together occurs substantially simultaneously with the swedging at 12. The close telescoping fit of the flanges on the two halves combined with the centering action obtained as a result of the cavities 18 and 19 in the dies A and B being conformed to the shape of the stampings 5 and 6 assures close coaxial relationship of the hubs 15 and 16 without separate piloting or centering means. Although there is a definite flattening indicated at 17 at the center of the tread portion of the finished wheel, the wheels, when finished, show very little, if any, of such flattening, the reason being, evidently, that in the process of pressing the parts together in the novel manner herein disclosed, the straight peripheral walls or flanges 7 and 8 become arched.

It is believed the foregoing description conveys a good understanding of the objects and advantages of my invention. The appended claims have been drawn to cover all legitimate modifications and adaptations.

I claim:

1. A hollow sheet metal wheel comprising two opposed dished circular sheet metal body parts having circumferentially extending cylindrical peripheral flanges disposed in close interfitting telescoping relationship, the inner part with its peripheral flange innermost being entered into the other or outer part appreciably beyond the edge of the peripheral flange on the outer part to define a free edge portion adapted to be bent radially inwardly to retain the two parts in assembled relation, the outer peripheral flange having an inwardly tapering inner end portion into which the edge portion of the inner flange is deformed to a corresponding taper in the assembling of the parts together for wedging inter-engagement of the parts around this circumference, there being an annular radially inwardly projecting shoulder defined in the outer part at the inner end of said tapered portion serving as a limit stop for abutment by the edge of the inner flange to limit inward movement of the inner flange into the outer flange in the assembling of the parts together, the free edge portion of said flange on said outer part being bent radially inwardly to retain the two parts of said wheel together in assembled relationship.

2. A hollow sheet metal wheel comprising two opposed dished circular sheet metal body parts having circumferentially extending cylindrical peripheral flanges disposed in close interfitting telescoping relationship, the inner part with its peripheral flange innermost being entered into the other or outer part appreciably beyond the edge of the peripheral flange on the outer part to define a free edge portion adapted to be bent radially inwardly to retain the two parts in assembled relation, the outer part having an inwardly tapered portion therein and the edge portion of the inner flange being tapered inwardly and wedgingly engaged in the tapered portion of the outer part when the two parts are assembled together, there being an annular radially inwardly projecting shoulder defined in the outer part at the inner end of said tapered portion serving as a limit stop for abutment by the edge of the inner flange to limit inward movement of the inner flange into the outer flange in the assembling of the parts together, the free edge portion of said flange on said outer part being bent radially inwardly to retain the two parts of said wheel together in assembled relationship.

3. A method of constructing a tireless wheel of sheet metal comprising the steps of providing two opposed circular dished sheet metal wheel halves, the one having an annular flange of relatively smaller diameter and the other having a similar annular flange of relatively larger diameter to receive the first mentioned flange with a close telescoping fit and also having an inwardly tapering portion, assembling the halves together with the flanges in telescoping relation and, while the half with the larger diameter flange is supported in a die to prevent spreading of the inwardly tapered portion of the flange, applying pressure axially by means of another die to the other half and to the edge portion of the larger diameter flange so as to swedge said edge portion while at the same time swedging the edge portion of the smaller diameter flange to conform to the aforesaid tapered portion.

4. A method as set forth in claim 3, wherein the wheel half with the larger diameter flange has an annular radially inwardly projecting shoulder defined at the inner end of the inwardly tapered portion of said flange serving as a limit stop for abutment by the edge of the smaller diameter flange to limit inward movement of the latter in the pressing of the parts together, the method consisting in pressing the parts together to the point of abutment with said limit stop of the edge of the smaller diameter flange in the swedging thereof to conform to the tapered portion of the larger diameter flange.

References Cited in the file of this patent

UNITED STATES PATENTS

| | | |
|---|---|---|
| 1,821,663 | Murray et al. | Sept. 1, 1931 |
| 2,629,420 | Walklet | Feb. 24, 1953 |

FOREIGN PATENTS

| | | |
|---|---|---|
| 185,153 | Great Britain | Sept. 7, 1922 |
| 574,397 | France | Mar. 28, 1924 |
| 640,548 | Germany | Jan. 7, 1937 |